United States Patent
Ko et al.

(10) Patent No.: US 10,505,836 B2
(45) Date of Patent: Dec. 10, 2019

(54) SYMMETRIC ROUTE ESTABLISHMENT WITH BIDIRECTIONAL LINKS FOR WIRELESS MESH NETWORKS

(71) Applicant: MEDIATEK INC., Hsin-Chu (TW)

(72) Inventors: Li-Chun Ko, Hsinchu (TW); Rongsheng Huang, Fremont, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/927,746

(22) Filed: Mar. 21, 2018

(65) Prior Publication Data

US 2018/0309659 A1 Oct. 25, 2018

Related U.S. Application Data (60) Provisional application No. 62/488,086, filed on Apr. 21, 2017, provisional application No. 62/501,956, filed on May 5, 2017.

(51) Int. Cl.
*H04L 12/721* (2013.01)
*H04W 40/08* (2009.01)
*H04W 84/18* (2009.01)
*H04W 40/24* (2009.01)

(52) U.S. Cl.
CPC ........... *H04L 45/124* (2013.01); *H04W 40/08* (2013.01); *H04W 40/246* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2003/0161268 A1* | 8/2003 | Larsson | H04L 45/10 370/229 |
| 2004/0143842 A1 | 7/2004 | Joshi | |
| 2005/0073992 A1 | 4/2005 | Lee et al. | |
| 2006/0007882 A1* | 1/2006 | Zeng | H04L 45/00 370/328 |
| 2006/0114850 A1* | 6/2006 | Avinash | H04W 40/22 370/328 |
| 2006/0293061 A1* | 12/2006 | Kobayashi | H04L 45/02 455/455 |

(Continued)

OTHER PUBLICATIONS

C. Perkins, Ad Hoc On-Demand Distance Vector (AODV) Routing, MEMO; Jul. 2003; 37 pages; University of Cincinnati.

*Primary Examiner* — Hong S Cho (57) ABSTRACT

Methods of establishing a bidirectional route between a route originator node and a route destination node in a wireless mesh network include the route originator node broadcasting a route request message to relay nodes in the network. The route request message identifies the route destination node as the final destination for the route request message and also identifies a transmitted power level. The relay nodes determine whether the link with the route originator node is bidirectional using the transmitted power level and the received signal strength to determine the power loss over the link and then by comparing its transmission power level to that power loss. The relay node forwards the route request message when the first link is bidirectional. This process is repeated at each node that receives the route request message until the route request message reaches the route destination mode.

19 Claims, 9 Drawing Sheets

(56) References Cited

U.S. PATENT DOCUMENTS

2008/0085702 A1* 4/2008 Park ............... H04W 40/28
                                            455/422.1
2009/0046712 A1* 2/2009 Nordmark ......... H04W 40/18
                                            370/389
2010/0195535 A1* 8/2010 Ziller ............. H04L 45/123
                                            370/254

* cited by examiner

SYMMETRIC ROUTE ESTABLISHMENT WITH BIDIRECTIONAL LINKS FOR WIRELESS MESH NETWORKS

RELATED APPLICATIONS

This application claims priority to U.S. Provisional Application No. 62/488,086, entitled "Route Establishment with Symmetric Links for Wireless Mesh Networks," filed on Apr. 21, 2017, and to U.S. Provisional Application No. 62/501,956, entitled "Route Establishment with Symmetric Links for Wireless Mesh Networks," filed on May 5, 2017, which are hereby incorporated by reference in their entirety.

BACKGROUND

A wireless mesh network is a collection of wireless nodes that can communicate with each other over a direct link between two nodes and/or over a route that includes a number of relay nodes (hops) between two nodes. A wireless mesh network is a form of a wireless ad hoc network. Ad Hoc On-Demand Distance Vector (AODV) Routing (RFC 3561) is a routing protocol for ad hoc networks including wireless mesh networks.

As described in RFC 3561, the types of messages defined by AODV include route request messages and route reply messages. A route request message is used by a source node to find a route to a destination node. The route reply message is sent from the destination node to the source node to complete discovery of the route and make the route available.

There are a number of issues not addressed by the AODV protocol as it is currently defined in RFC 3561. For one, routes are established and maintained in an asymmetric manner from the source node to the destination node. That is, the source node may communicate to the destination node over unidirectional links in a route that includes a set of one or more relay nodes, and the destination node may respond to the source node over unidirectional links in another route that includes a different set of relay nodes. Maintenance of symmetric routes, over bidirectional links, is not addressed by AODV.

Asymmetric routes can affect the performance or quality of the wireless mesh network. For example, according to RFC 3561, a node is to ignore a route request message that is received over a link that is unidirectional. This has two detrimental effects: first, it is necessary to periodically check the links to determine whether a link is unidirectional; and second, because route requests over unidirectional links are to be ignored, there is less flexibility when selecting routes between the source and destination nodes. Moreover, when it is necessary to maintain an asymmetric route, it is also necessary to check each link individually to determine whether it is still available. Asymmetric routes also increase the size of (number of entries in) routing tables because they require an entry for each unidirectional link.

SUMMARY

Embodiments according to the present invention address the issues described above by providing methods (and devices and networks that implement those methods) of establishing and maintaining bidirectional routes between route originator (source) nodes and route destination nodes.

In an embodiment, a route originator node broadcasts a route request message to a number of relay nodes over respective links in a wireless mesh network. In an embodiment, the route request message includes a transmitted power level. Each of the relay nodes determines whether its respective link to the route originator node is bidirectional. If a relay node's link to the route originator node is bidirectional, then the relay node forwards the route request message to another node in the wireless mesh network. This process is repeated at each node that receives the route request message until the route request message reaches the route destination mode.

In an embodiment, the route request message includes a transmitted power level that can be used to determine whether a link is bidirectional. In such an embodiment, a relay node that receives the route request message compares the transmitted power level in that message to the received signal strength for the message, to determine the amount of power loss on the link between the relay node and the route originator node. The relay node then compares its transmission power level to the amount of power loss on the link. If the relay node's transmission power level is greater than the amount of power loss on the link, then the link is bidirectional. The relay node can instead, or can also, transmit a test message over the link to the route originator node; if a response to the test message is received, then the link is bidirectional.

The route destination node can receive the route request message over a number of links from a number of relay nodes. In an embodiment, after identifying bidirectional links, the route destination node selects the bidirectional link with the lowest amount of power loss and the fewest number of hops back to the route originator node. The route destination node transmits a unicast route reply message over the selected link to a relay node. The relay node forwards the route reply message to another relay node until the route reply message reaches the route originator node. For robustness, in an embodiment, each relay node transmits an acknowledgment message to the relay node from which the route reply was received.

The route request message was forwarded from the route originator node to the route destination node only over bidirectional links, and the route of the route reply message from the route destination node to the route originator node will be over those same links. Hence, in this manner, a symmetric (bidirectional) route between the route originator node and the route destination node can be established.

When it receives the route reply message forwarded from the route destination node, the route originator node responds by transmitting a unicast route confirmation message back to the route destination node along the symmetric route, so that each node on the route is notified of the establishment of the symmetric route.

Thus, in embodiments according to the present invention, it is not necessary to periodically check the links to determine whether a link is unidirectional. Also, there is more flexibility when selecting routes between the originator (source) and destination nodes. Moreover, route maintenance is reduced by half when, for example, two unidirectional links in an asymmetric route are replaced by bidirectional link in a symmetric route. This in turn reduces the associated number of entries in routing tables by half. Because the route destination node selects a potential route based on the amount of power loss and also (in an embodiment) based on the number of hops, the bidirectional route that is established has the lowest amount of power loss and the fewest number of hops of the possible routes that are available.

Embodiments according to the present invention thus improve computer technologies (e.g., by improving the efficiency and performance of wireless communication devices) and computer-related technologies (e.g., by improving the quality and performance of wireless mesh networks).

These and other objects and advantages of the various embodiments according to the present invention will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments according to the present invention and, together with the detailed description, serve to explain the principles of the invention.

DETAILED DESCRIPTION

Reference will now be made in detail to the various embodiments according to the present invention, examples of which are illustrated in the accompanying drawings. While described in conjunction with these embodiments, it will be understood that they are not intended to limit the invention to these embodiments. On the contrary, the disclosure is intended to cover alternatives, modifications and equivalents, which may be included within the spirit and scope of the disclosure as defined by the appended claims.

Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "sending," "transmitting," "determining," "indicating," "identifying," "forwarding," "comparing," "including," "selecting," or the like, refer to actions and processes (e.g., the flowcharts 400, 500, and 600 of FIGS. 4, 5 and 6, respectively) of a computing system or similar electronic computing device or processor (e.g., the system 100 of FIG. 1). The computing system or similar electronic computing device manipulates and transforms data represented as physical (electronic) quantities within the computing system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 1:
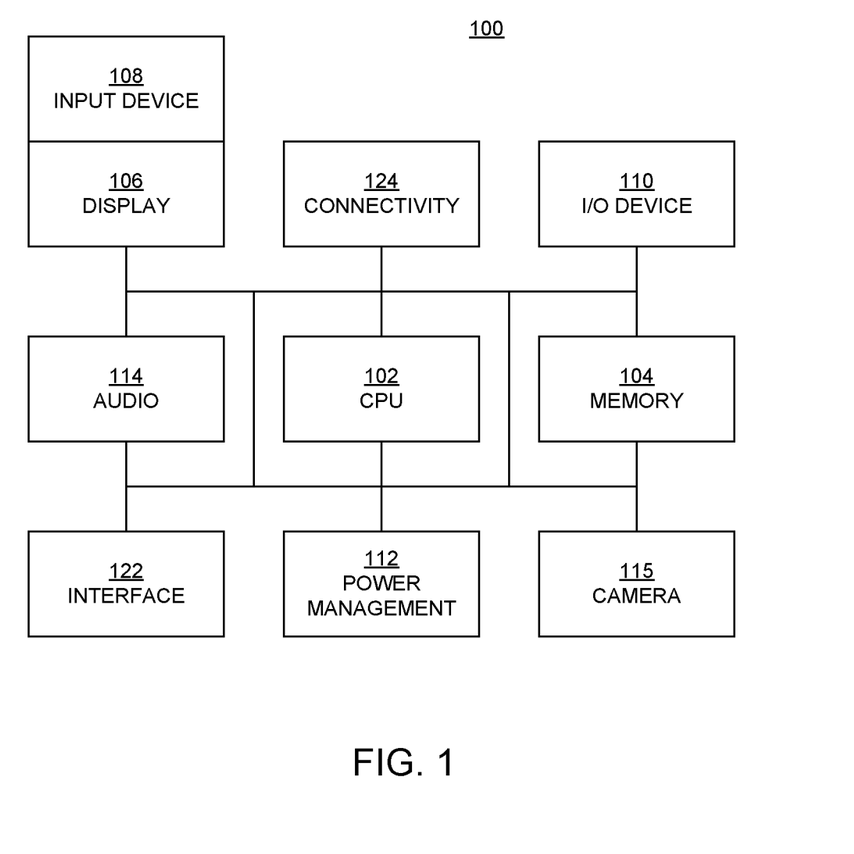
FIG. 1 is a block diagram of an example of a computing system or device capable of implementing embodiments according to the present invention.

FIG. 1 is a block diagram of an example of a computing system or device 100 capable of implementing embodiments according to the present invention. The computing system 100 broadly represents any single or multi-processor computing device or system capable of executing computer-readable instructions. Depending on the implementation, the computing system 100 may not include all of the elements shown in FIG. 1, and/or it may include elements in addition to those shown in FIG. 1.

The computing system 100 may be a device such as, but not limited to: a smartphone; a desktop, laptop, tablet, or handheld computer; a gaming device; a printer; a display device including a television; a smart Internet-of-things (IOT) device such as but not limited to a smart speaker, smart plug, or smart bulb; or the like. In an embodiment, the computing system 100 is a Bluetooth-enabled device, and can be any type of such a device. The computing system 100 is an example of a node in a wireless mesh network (described below).

In its most basic configuration, the computing system 100 may include at least one processor 102 (CPU) and at least one memory 104. The CPU 102 generally represents any type or form of processing unit capable of processing data or interpreting and executing instructions. In certain embodiments, the CPU 102 may receive instructions from a software application or module. These instructions may cause the processor 102 to perform the functions of one or more of the example embodiments described and/or illustrated herein. The CPU 102 may include a communications processor.

The memory 104 generally represents any type or form of volatile or non-volatile storage device or medium capable of storing data and/or other computer-readable instructions. In certain embodiments, the computing system 100 may include both a volatile memory unit (such as, for example, the memory 104) and a non-volatile storage device (not shown).

The computing system 100 may also include a display device 106 configured to display content. The display device 106 also may be configured to display a graphical user interface (GUI) that provides an easy to use interface between a user and the computing system 100.

The computing system 100 may also include an input device 108. The input device 108 may include a touch sensing device (a touch screen) configured to receive input from a user's touch and to send this information to the CPU 102. The input device 108 may be integrated with the display device 106 or they may be separate components. In the illustrated embodiment, the input device 108 is a touch screen that is positioned over or in front of the display device 106.

The communication interface 122 broadly represents any type or form of communication device or adapter capable of facilitating wireless or wired communication and data transfer between the example computing system 100 and one or more other devices. The computing system 100 may also include a connectivity subsystem 124, including a transceiver (or a transmitter and a receiver) and an antenna, for wireless communication with one or more other devices.

As illustrated in FIG. 1, the computing system 100 may also include at least one input/output (I/O) device 110. Examples of an I/O device 110 include, without limitation, a keyboard, a pointing or cursor control device (e.g., a mouse), a speech recognition device, or any other input device.

The computing system 100 may also include an audio subsystem 114, including a speaker and a microphone. The computing system 100 may also include a camera subsystem 115.

Many other devices or subsystems may be connected to computing system 100. Conversely, all of the components and devices illustrated in FIG. 1 need not be present to practice the embodiments described herein. The devices and subsystems referenced above may also be interconnected in different ways from that shown in FIG. 1. The computing system 100 may also employ any number of software, firmware, and/or hardware configurations.

A computer-readable medium containing a computer program may be loaded into the computing system 100. All or a portion of the computer program stored on the computer-readable medium may then be stored in the memory 104. When executed by the CPU 102, a computer program loaded into the computing system 100 may cause the CPU 102 to perform and/or be a means for performing the functions of the example embodiments described and/or illustrated herein. Additionally or alternatively, the example embodiments described and/or illustrated herein may be implemented in firmware and/or hardware.

Figure 2:
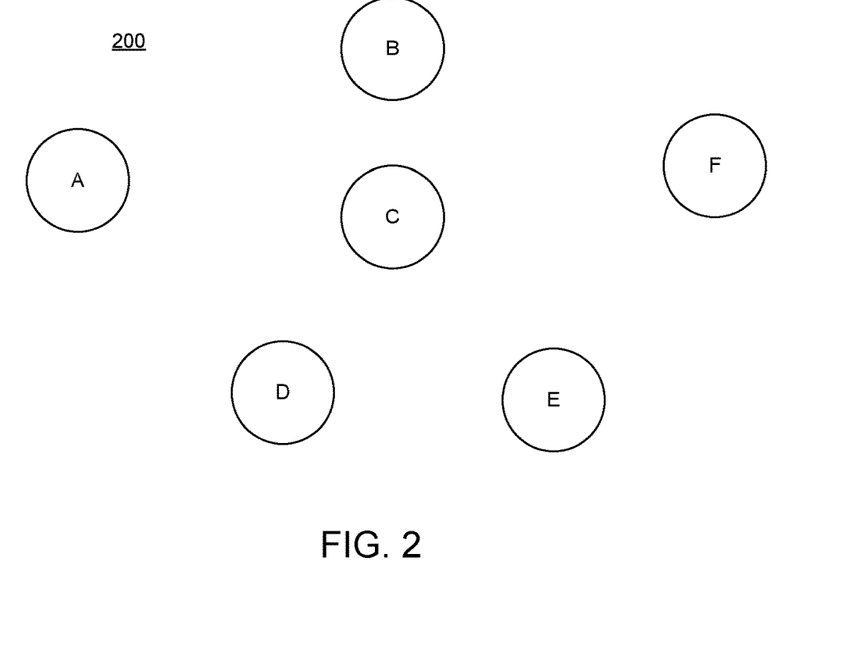
FIG. 2 illustrates an example of a wireless mesh network in embodiments according to the present invention.

Symmetric Route Establishment with Bidirectional Links for Wireless Mesh Networks FIG. 2 illustrates an example of a wireless mesh network 200 in embodiments according to the present invention. In the FIG. 2 example, the wireless mesh network 200 includes nodes A, B, C, D, E, and F (nodes A-F). Each node of the nodes A-F can be implemented using a system or device such as, but not limited to, the computing system 100 of FIG. 1. Each of the nodes A-F may be configured according to its respective role or function in the wireless mesh network 200. That is, the nodes A-F are not necessarily the same type of device. While a certain number of nodes are illustrated, the present invention is not so limited.

In an embodiment, the wireless mesh network 200 is a Bluetooth-enabled network implemented per the Ad Hoc On-Demand Distance Vector (AODV) Routing protocol (RFC 3561). In the example of FIG. 2, the nodes A and F are edge nodes, and the nodes B, C, D, and E (B-E) are relay nodes. In the examples to follow, node A is establishing a symmetric route with node F, in which the symmetric route includes only bidirectional links between nodes. In the discussion to follow, node A is referred to as a route originator node, and node F is referred to as a route destination node.

A bidirectional link is used herein to mean that, for example, node A can successfully transmit a message to node B, and node B can also successfully transmit a message to node A. That is, a bidirectional link is a link in which: i) the transmitted power level of node A is high enough so that, even accounting for power losses on the link from node A to node B, the received signal strength of a message received by node B from node A is greater than the minimum sensitivity of node B; and ii) the transmitted power level of node B is high enough so that, even accounting for power losses on the link from node B to node A, the received signal strength of a message received by node A from node B is greater than the minimum sensitivity of node A. The minimum sensitivity of a node refers to the minimum received signal strength that is required to achieve a desired signal-to-noise ratio, or the minimum power level that a receiving node can detect. The minimum sensitivity, power loss, and transmitted power level can be measured in units of decibel-milliwatts (dBm).

FIGS. 3A through 3I illustrate an example of symmetric route establishment using bidirectional links between the nodes in the wireless mesh network 200 in embodiments according to the present invention. The example about to be described can be readily extended to different arrangements and different numbers of nodes.

Figure 3A:
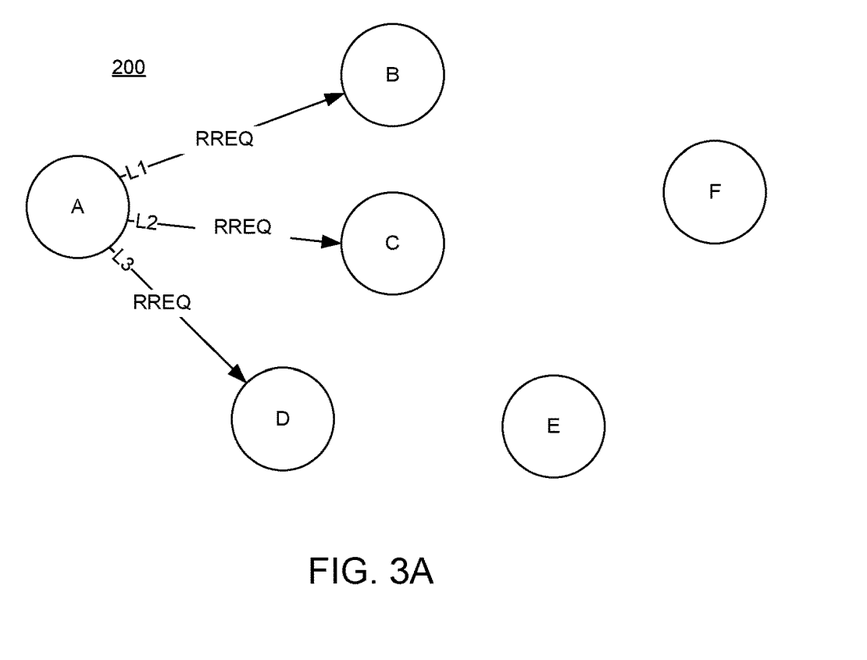
FIGS. 3A, 3B, 3C, 3D, 3E, 3F, 3G, 3H, and 3I (3A-3I) illustrate an example of symmetric route establishment using bidirectional links between the nodes in the wireless mesh network in embodiments according to the present invention.

With reference first to FIG. 3A, to begin establishing a symmetric route to the route destination node F, the route originator node A transmits (broadcasts) a route request message (RREQ) to each of the next immediate relay hops. That is, the route request message is broadcast from the route originator node A to the relay nodes that are within direct transmission range; those nodes are known as neighbor nodes. In this example, the route request message is broadcast from the route originator node A to the relay nodes B, C, and D. In an embodiment, the route request message includes the parameters listed in Table 1.

TABLE 1

Example Parameters in a Route Request Message

| Field | Notes |
| --- | --- |
| OPT | Options |
| PD | Route Destination |
| PO | Route Originator |
| (D)OFN | (Delegate) Originator Forwarding Number |
| (D)OPM | (Delegate) Originator Path Metric |
| PTX | Transmitted Power Level |
| DPO (optional) | Delegate Route Originator |
| OAR (optional) | Originator Address Range |

The route request message may include parameters other than those shown in Table 1. For example, in an embodiment, the route request message includes a hop count that is incremented each time the route request message is forwarded from one node to another node.

Significantly, as shown in Table 1, the route request message includes the transmitted power level: the power level at which a node (e.g., the route originator node A) transmitted the route request message. Consequently, by exploiting the reciprocity of the wireless links L1, L2, and L3 between node A and nodes B, C, and D, respectively, the amount of power loss on each link can be determined by each of those relay nodes based on a measure of the received signal strength (RSS) of the route request message that it receives. That is, the amount of power loss on link L1 between node A and node B is PTX(A) minus RSS(B), where PTX(A) is the transmitted power level included by the route originator node A in the route request message, and RSS(B) is the measure of the received signal strength of the route request message received by node B. Nodes C and D can determine the amount of power loss on links L2 and L3, respectively, in a similar manner.

Also of significance, each of the relay nodes B, C, and D only forwards the route request message to another node (the next neighbor node or hop) if the link between the relay node and the route originator node A is bidirectional. For example, node B will only forward the route request message from the route originator node A if link L1 is bidirectional. In general, a receiving node will only forward a route request message from a transmitting node if the link between the receiving and transmitting nodes is bidirectional.

In embodiments, to determine whether a link is bidirectional, the receiving node (e.g., relay node) compares its transmission power level (the power level at which it can transmit a message) to the amount of power loss on the link. For example, node B compares its transmission power level to the amount of power loss on link L1 between the route originator node A and the relay node B; if the transmission power level of node B is greater than the amount of power loss on that link, then the link is bidirectional.

In an embodiment, instead of comparing its transmission power level and the amount of power loss on a link as just described, a receiving node can send a test message to the transmitting node in response to the route request message; if a response to the test message is received, then the link between the receiving and transmitting nodes is a bidirectional link. For example, node B can send a test message to the route originator node A when a route request message is received from node A, and if node B receives a response to the test message from node A, then link L1 is bidirectional.

In another embodiment, a node can use both of the above approaches to determine whether a link is bidirectional. For example, a node can compare its transmission power level and the amount of power loss on a link as described above, and then can send a test message as described above if the margin between them is small (e.g., less than a specified threshold value).

Figure 3B:
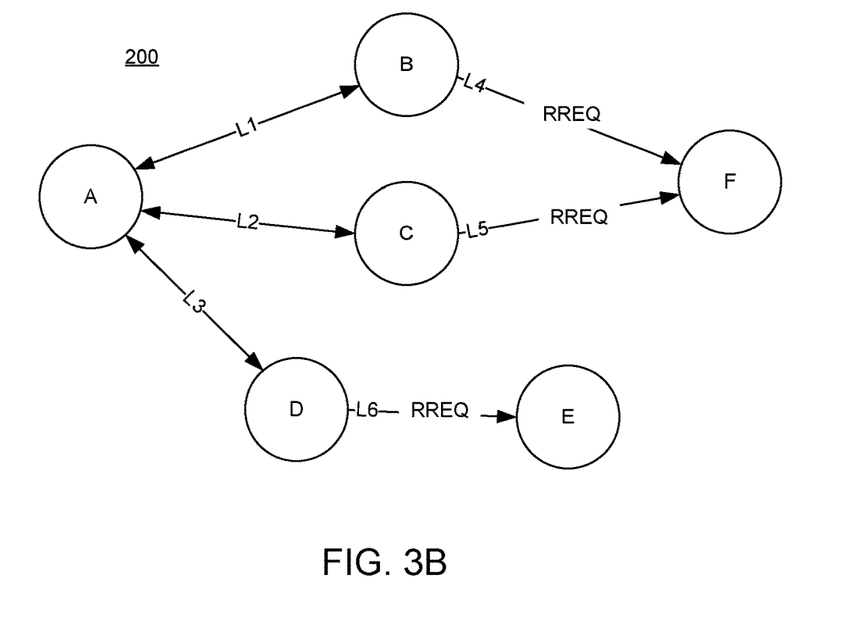

With reference now to FIG. 3B, in this example, each of the relay nodes B, C, and D has determined that its respective link with the route originator node A is bidirectional, and so each of these nodes transmits (forwards) the route request to the next neighbor node in the wireless mesh network 200. As noted above, if the link between a relay node and the route originator node A was not bidirectional, then that node would not forward the route request message.

Thus, nodes B and C transmit the route request message to node F (the route destination node) over links L4 and L5, respectively, and node D transmits the route request message to node E over link L6. Thus, the next neighbor node may be an edge node or it may be another relay node.

The transmitted power level for each of the nodes B, C, and D is included in the respective route request message transmitted by the node, so that each of the next neighbor nodes (nodes E and F) can determine whether the links L4, L5, and L6 with nodes B, C, and D, respectively, are bidirectional using the approach or approaches described above. In an embodiment, each of the nodes B, C, and D also increments a hop count in the route request message transmitted by the node. Therefore, to be more precise, the nodes B, C, and D each transmit a respective forwarding version of the route request message originally transmitted by the route originator node A. That is, in comparison to the route request message transmitted by the route originator node A, the route request messages transmitted by nodes B, C, and D include the respective transmitted power levels used by those nodes and may also include an incremented hop count.

Figure 3C:
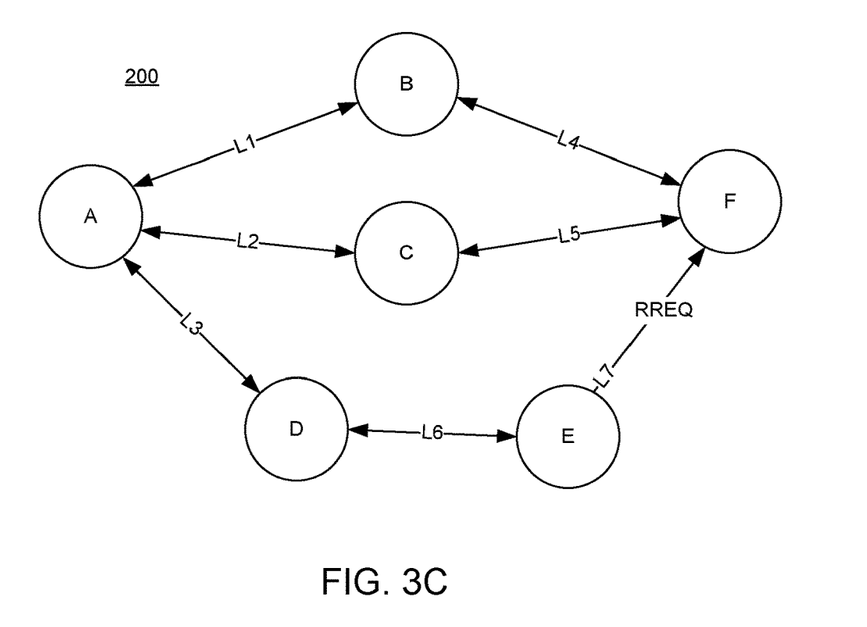

With reference to FIG. 3C, in this example, node E has determined that link L6 from node D is bidirectional, and so node E transmits the route request message to node F over link L7. As mentioned above, node E includes its transmitted power level in the route request message that it transmits, and may also increment a hop count in that route request message, and so more precisely node E transmits a forwarding version of the route request message transmitted by node D.

Because node F (the route destination node) is an edge node, it does not forward the route request messages received from nodes B, C, and E.

Figure 3D:
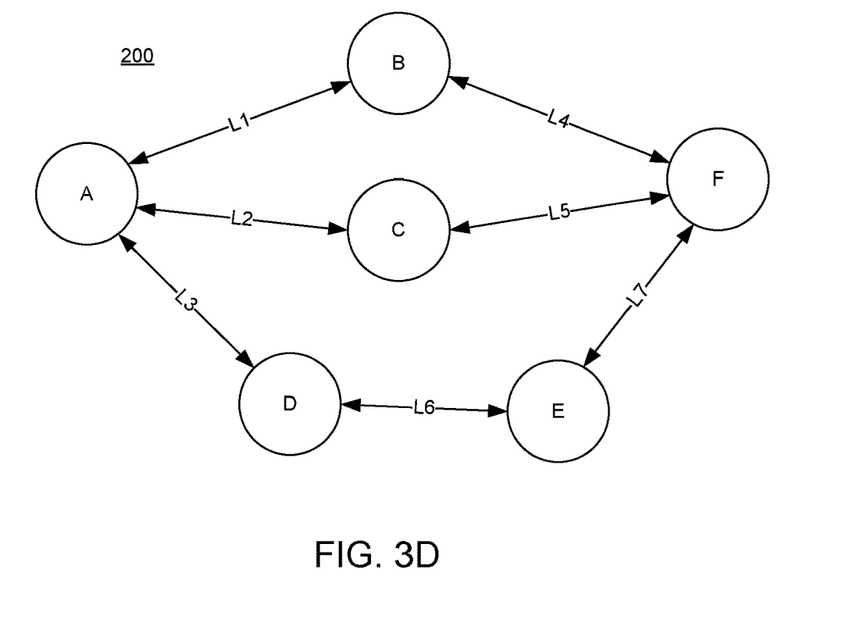

With reference to FIG. 3D, the route destination node F begins the process of responding to the route request messages that were originated by the route originator node A and received from nodes B, C, and E. Specifically, by comparing the transmitted power levels in the route request messages received from nodes B, C, and E and the received signal strengths of each of those messages, the route destination node F can determine the amount of power loss on each of the links L4, L5, and L7 and can also determine which of those links are bidirectional based on a comparison with the transmission power level of node F, as described above. Also, in an embodiment, the route request messages from nodes B, C, and E include a respective hop count, and so the route destination node F has the hop count for each of the links (the number of hops between node F and the route originator node A).

In this example, each of the links L4, L5, and L7 is bidirectional, and so the route destination node F selects one of those links to establish a bidirectional route with the route originator node A. If a link was unidirectional, that link would not be considered by the route destination node F. Note that, because the route request messages received by the route destination node F were only forwarded by relay nodes that have a bidirectional link with their respective neighbor nodes, each of the links L4, L5, and L7 is part of a bidirectional route that extends all the way back to the route originator node A.

In an embodiment, the route destination node F selects a link based on the amount of power loss associated with that link. In such an embodiment, the route destination node F selects the link that has the least amount of power loss. In another embodiment, the route destination node F selects a link based on both the amount of power loss and the hop count. For example, if two links with the lowest amount of power loss have the same or about the same amount of power loss, then the route destination node F may select the link of those links that has the lower hop count.

Table 2 provides example values for the amount of power loss (in dBm) and the hop count associated with the nodes and links that were used to transmit a route request message to the route destination node F.

TABLE 2

Example Values

| Node (Link) | Power Loss | Hop Count |
|---|---|---|
| B (L4) | −90 | 2 |
| C (L5) | −85 | 2 |
| E (L7) | −85 | 3 |

Figure 3E:
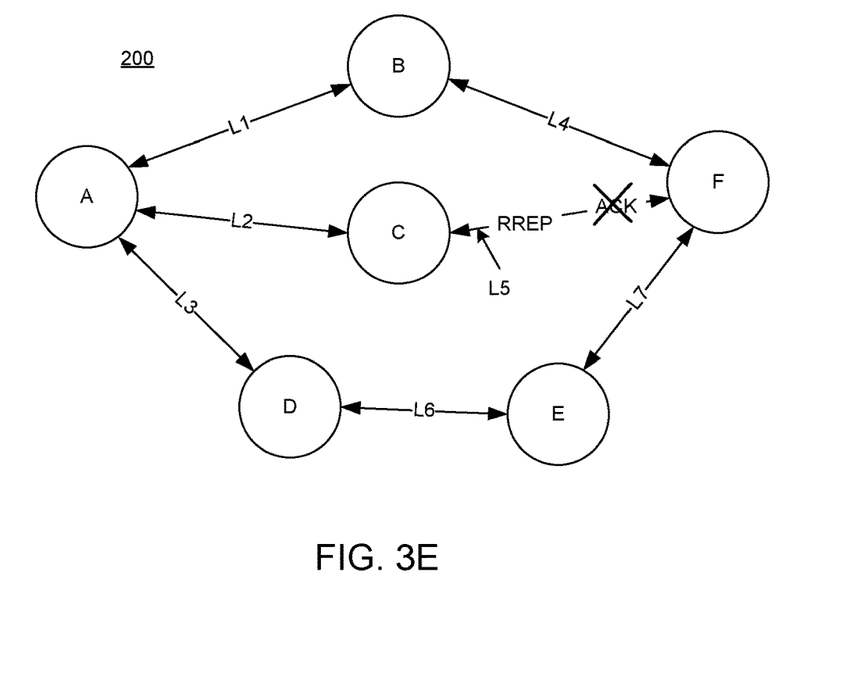

With reference to FIG. 3E, in this example, the route destination node F selects link L5 because it has the lowest power loss and has a lower hop count compared to link L7. Accordingly, the route destination node F transmits a route reply message (RREP) over link L5 to node C. The route reply message is a unicast message directed to the route originator node A.

In an embodiment, to make the route selection process more robust, an acknowledgment message (ACK) is transmitted by node C to the route destination node F in response to the route reply message. In another embodiment, the route destination node F transmits a test message to node C before transmitting the route reply message, and waits for a response from node C to the test message. In either case, if the route destination node F does not receive a response from node C, then the route destination node selects another node/link.

In this example, an acknowledgment message from node C is not received by the route destination node F. Node C may not have received the route reply message, or it may have received that message but node F may not have received the acknowledgment message. This might occur because the amount of power loss over link L5 has increased to a level that is greater than the transmission power level of either node C (in the latter case) or the route destination node F (in the former case) due to, for example, temporary interference. Thus, at this point, link L5 may no longer be bidirectional. Consequently, the route destination node F will ignore (either not accept or not process) subsequent route request messages received from node C until a condition is satisfied that demonstrates that link L5 is again bidirectional. In an embodiment, the route destination node F periodically transmits test messages to node C, and the condition is satisfied when node C responds to one of the test messages. In another embodiment, link L5 is checked using messages (e.g., round-trip messages transmitted by the route destination node F) that allow the amount of power loss on the link to be determined as described above, and the condition is satisfied when the amount of power loss is less than the transmission power level of node A and that of the route destination node F.

Figure 3F:
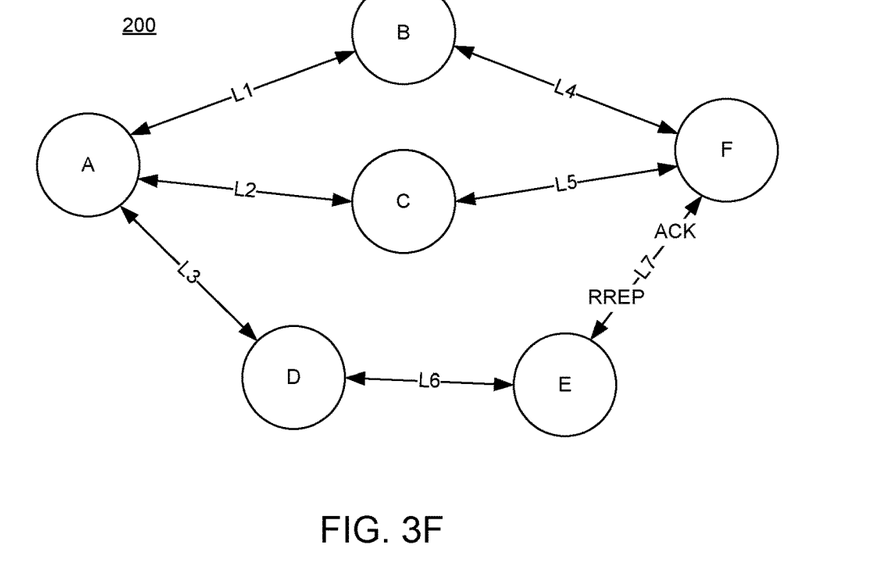

With reference now to FIG. 3F, in this example, the route destination node F now selects link L7 because it has a lower power loss than link L4. In an alternative implementation, link L4 may be selected because it has a lower hop count. In this example, the route destination node F transmits a route reply message over link L7 to node E. As before, the route reply message is a unicast message directed to the route originator node A.

In this example, node E responds to the route reply message and transmits an acknowledgment message to the route destination node F, thereby confirming that it received the route reply message.

Figure 3G:
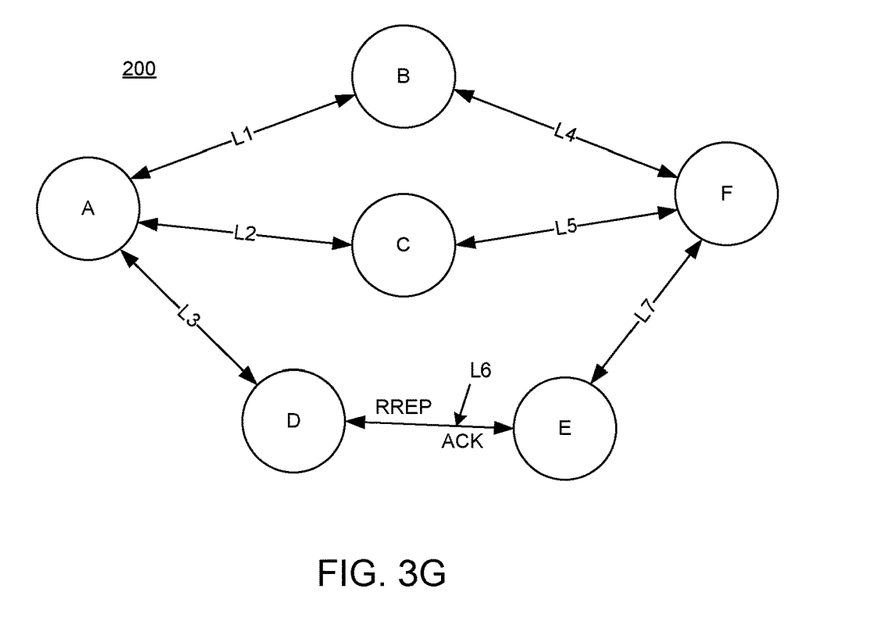

With reference to FIG. 3G, node E transmits (forwards) the route reply message to node D over link L6. More specifically, node E transmits a forwarding version of the route reply message to node D; the forwarding version may be the same as the route reply message that is received from the route destination node F. In an embodiment, node D transmits an acknowledgment message to node E in response to the route reply message. The scenario in which node D does not receive the route reply message is addressed further below.

Figure 3H:
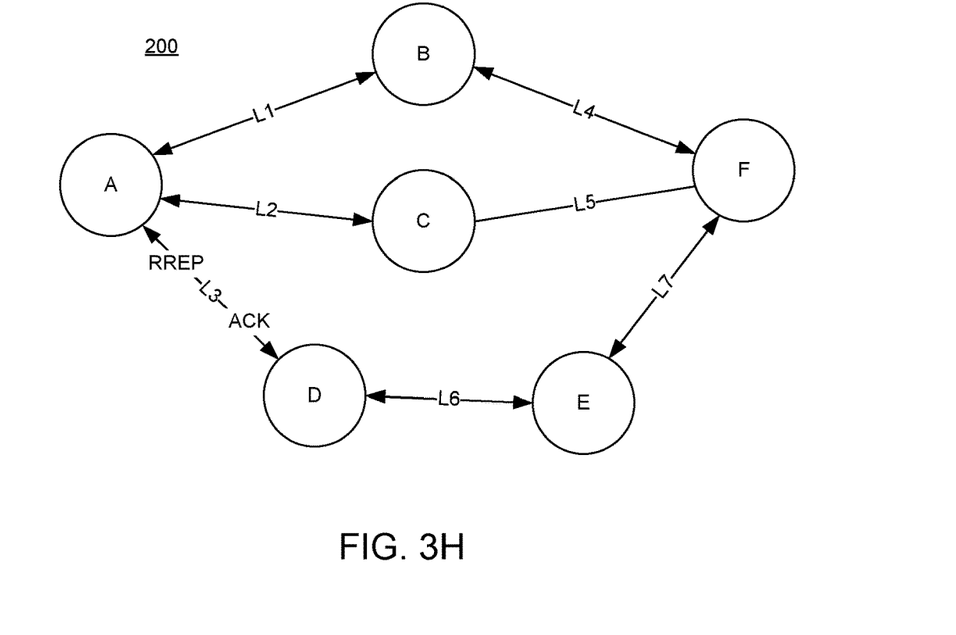

With reference to FIG. 3H, node D transmits (forwards) the route reply message to the route originator node A over link L3. More specifically, node D transmits a forwarding version of the route reply message to the route originator node A; the forwarding version may be the same as the route reply message that is received from node E. In an embodiment, the route originator node A transmits an acknowledgment message to node D in response to the route reply message. The scenario in which node A does not receive the route reply message is addressed below.

Figure 3I:
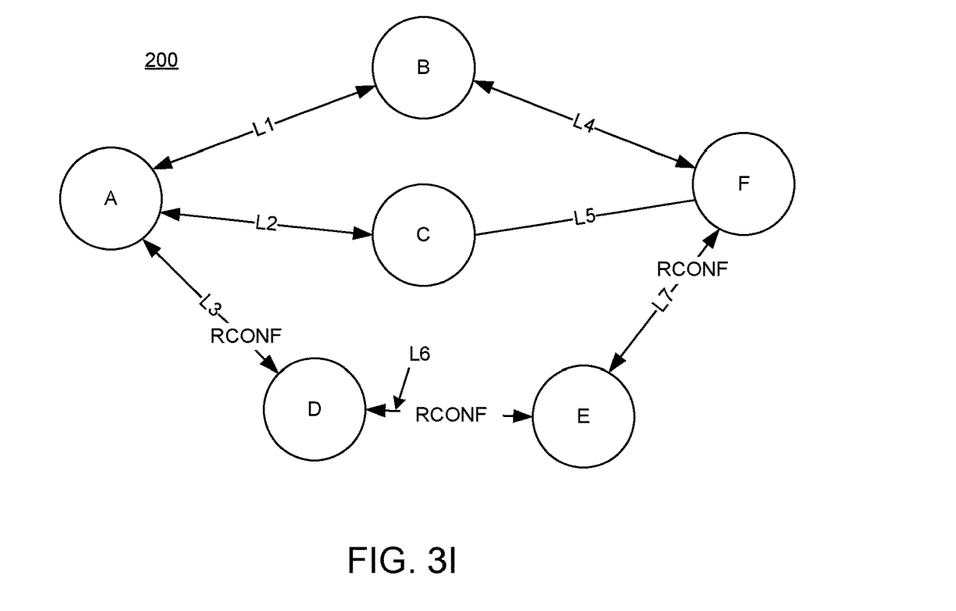

With reference to FIG. 3I, in response to receiving the route reply message from node D, the route originator node A transmits a route confirmation message (RCONF) back to node D. The route confirmation message is a unicast message directed to the route destination node F. The route confirmation message is then transmitted from node D to node E, which in turn transmits the route confirmation message to the route destination node F. In this manner, the route confirmation message establishes that the route between the route originator node A and the route destination node F is symmetric.

Furthermore, the route confirmation message addresses the scenario in which a node does not transmit an acknowledgment message. If a node (e.g., node D) that is not a neighbor to the route destination node F does not receive the route reply message, then the route originator node A also will not receive the route reply message and therefore will not send the route confirmation message. The same thing happens of course if node A itself does not receive the route reply message. When the route destination node F does not receive a route confirmation message from the route originator node A, the route destination node recognizes that a bidirectional route has not been established over the link it selected (link L7 in this example), and so it selects another link and transmits another route reply message over that other link, and the process continues as described above.

The route confirmation message also serves to inform the nodes that receive it that they are part of the bidirectional route between a route originator node and a route destination node. In this example, because they receive the route confirmation message, nodes D and E determine that they are part of the bidirectional route between the route originator node A and the route destination node F and update their respective routing table accordingly. Because the routing table needs to include only a single entry for the bidirectional route, the number of entries in the routing table is reduced.

In this example, nodes B and C do not receive the route confirmation message and so do not update their routing tables. Consequently, if nodes B, C, and D receive a subsequent message (other than a route request message) from node A and directed to node F, then only node D would forward that message along the bidirectional route; nodes B and C would not forward that message.

Thus, in embodiments according to the present invention as just described in conjunction with FIGS. 3A-3I, it is not necessary to periodically check the links to determine whether a link is unidirectional. Also, there is more flexibility when selecting routes between the route originator and route destination nodes. Moreover, route maintenance is reduced by half when an asymmetric route is replaced by a symmetric route. This in turn reduces the associated number of entries in routing tables by half. Because the route destination node selects a potential route based on the amount of power loss and also (in an embodiment) based on the number of hops, the bidirectional route that is established has the lowest amount of power loss and the fewest number of hops of the routes that are available.

Embodiments according to the invention thus improve computer technologies (e.g., by improving the efficiency and performance of wireless communication devices) and computer-related technologies (e.g., by improving the quality and performance of wireless mesh networks).

Figure 4:
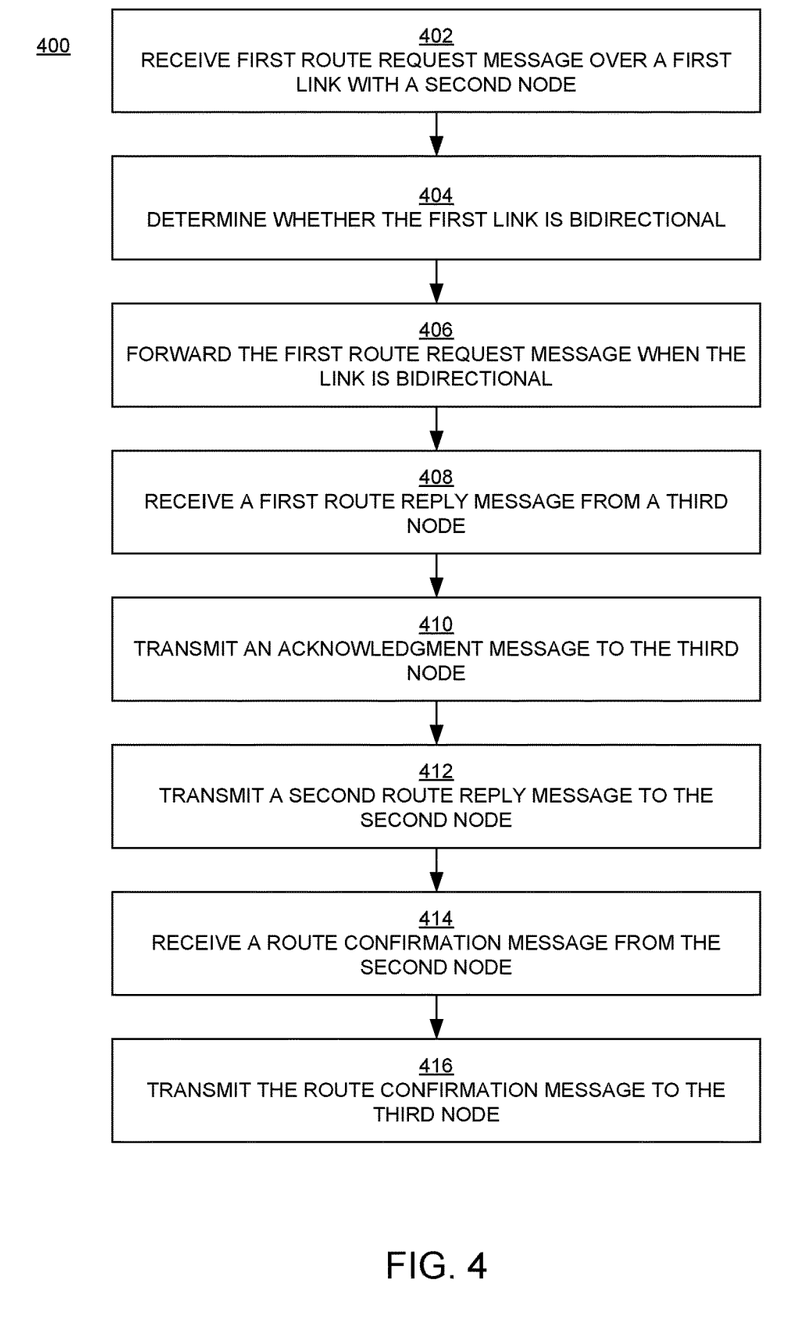
FIGS. 4, 5, and 6 are flowcharts of examples of operations in computer-implemented methods for symmetric route establishment using bidirectional links in embodiments according to the present invention.
Figure 5:
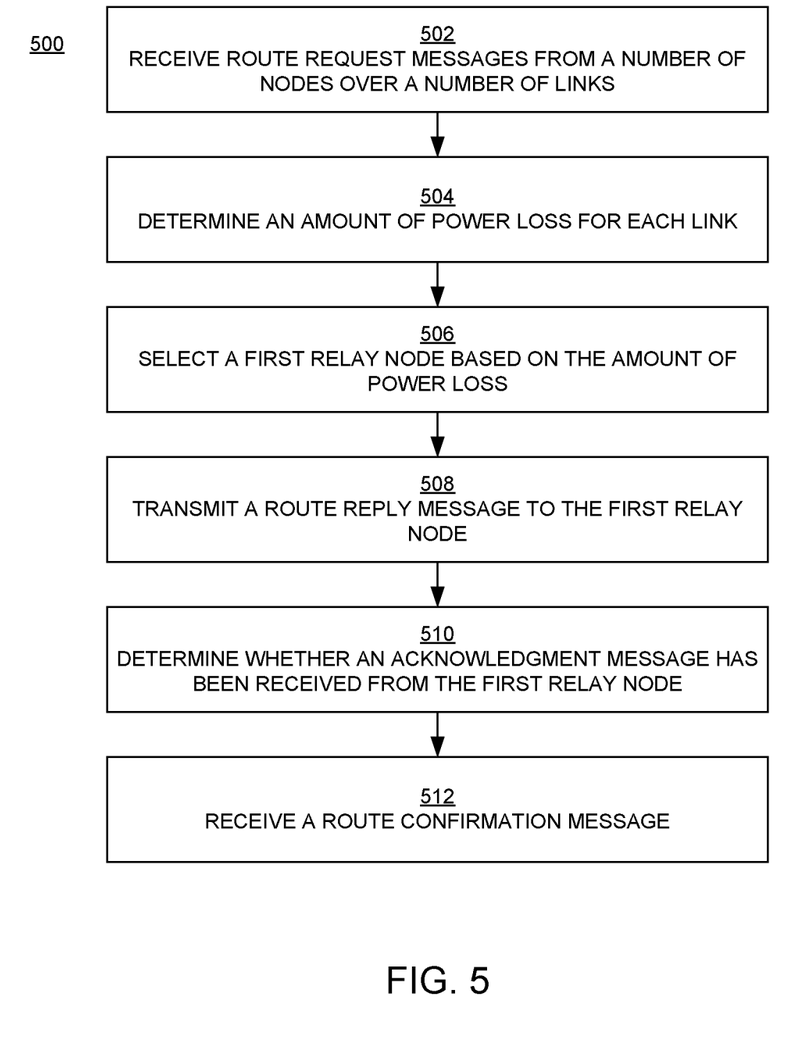
Figure 6:
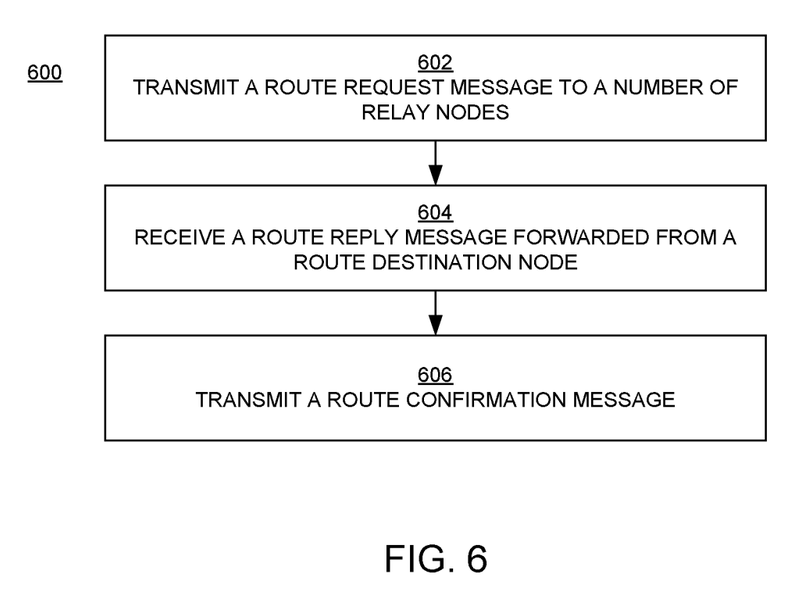

FIGS. 4, 5, and 6 are flowcharts 400, 500, and 600, respectively, of examples of operations in computer-implemented methods for symmetric route establishment using bidirectional links in embodiments according to the present invention. The operations can be performed in and by the computing system 100 of FIG. 1.

With reference also to FIG. 2, the operations of FIG. 4 are performed by a relay node in a wireless mesh network (e.g., nodes B, C, D, and E of the wireless mesh network 200), the operations of FIG. 5 are performed by a route destination node (e.g., node F), and the operations of FIG. 6 are performed by a route originator node (e.g., node A).

In block 402 of FIG. 4, the relay node receives a first route request message over a first link with a second node in the wireless mesh network. Depending on the location of the relay node in the wireless mesh network, the second node may be the route originator node or it may be another relay node. The first route request message includes information that identifies a route destination node as the final destination for the first route request message, and also includes information that identifies the transmitted power level used by the second node to transmit the first route request message.

In block 404, the relay node determines whether the first link is bidirectional.

In an embodiment, to determine whether the first link is symmetrical, an amount of power loss between the second node and the relay node is determined by comparing the transmitted power level used by the second node to transmit the first route request message and a measure of received signal strength for the first route request message. Then, the amount of power loss and the transmission power level for the relay node are compared. The first link is bidirectional if the transmission power level for the relay node is greater than the amount of power loss.

In an embodiment, to determine if the first link is symmetrical, the relay node transmits a test message to the second node in response to receiving the first route request message from the second node, and then determines whether a response to the test message is received. The first link is bidirectional if the response to the test message is received.

In block 406, the relay node forwards the first route request when the first link is bidirectional. More specifically, the relay node transmits a second route request message that is a forwarding version of the first route request message over a second link to a third node in the wireless mesh network when the first link is bidirectional, and otherwise does not transmit the second route request message. Depending on the location of the relay node in the wireless mesh network, the third node may be the route destination node or it may be another relay node. In an embodiment, the second route request message includes information that identifies the transmitted power level used by the relay node to transmit the second route request message.

In an embodiment, the relay node increments a value of a hop count in the first route request message and includes the incremented value of the hop count in the second route request message.

In block 408, subsequent to transmitting the second route request message, the relay node receives a unicast first route reply message from the third node. The first route reply message includes information that identifies the route originator node as the final destination for the first route reply message.

In block 410, the relay node transmits an acknowledgment message to the third node in response to the first route reply message.

In block 412, in response to receiving the first route reply message, the relay node transmits a unicast second route reply message (a forwarding version of the first route reply message) to the second node.

In block 414, subsequent to transmitting the second route reply message, the relay node receives a unicast route confirmation message from the second node. The route confirmation message includes information that indicates that a forwarding version of the first route reply message was received by the route originator node.

In block 416, the relay node transmits the route confirmation message to the third node.

With reference now to FIG. 5, in block 502, the route destination node receives route request messages from a number of relay nodes over links in the wireless mesh network. Each route request message includes information that identifies the route originator node, information that identifies a respective transmitted power level used by the relay node to transmit the route request message to the route destination node, and a respective hop count.

In block 504, the route destination node determines a respective amount of power loss for each of the links by comparing, for each of the route request messages, the respective transmitted power level and a measure of received signal strength for the route request message.

In block 506, the route destination node selects a first relay node (or a first link) based on the respective amount of power loss and, in an embodiment, the respective value of the hop count.

In block 508, the route destination node transmits a unicast route reply message to the first relay node over the first link. The route reply message includes information that identifies the route originator node as the final destination for the first route reply message.

In block 510, in an embodiment, the route destination node determines whether an acknowledgment message has been received from the first relay node in response to the route reply message.

If the acknowledgment message has not been received, then the route destination node transmits the route reply message to a second relay node over a second link.

In an embodiment, if the acknowledgment message has not been received from the first relay node, then the route destination node periodically transmits a test message to the first relay node over the first link until a response to the test message is received.

In an embodiment, if the acknowledgment message has not been received, then the route destination node does not respond to subsequent route request messages from the first relay node until a condition is satisfied. In an embodiment, the condition is satisfied when the first relay node responds to a test message transmitted by the route destination node. In an embodiment, the condition is satisfied when the amount of power loss on the first link between the first relay node and the route destination node satisfies a threshold value.

In block 512, in a scenario in which the acknowledgment message from the first relay node was received, the route destination node receives a unicast route confirmation message from the first relay node. In general, the route destination node receives the route confirmation message from the relay node selected in block 510. The route confirmation message includes information that indicates that a version of the route reply message was received by the route originator node.

With reference now to FIG. 6, in block 602, the route originator node transmits a broadcast route request message to a number of relay nodes in the wireless mesh network. The broadcast route request message includes information that identifies the route destination node as the final destination for the broadcast message.

In block 604, the route originator node receives, from a relay node that received the route request message, a unicast route reply message (a forwarded version of a unicast route reply message that the route destination node transmitted in response to the route request message).

In block 606, in response to the route reply message received from the relay node, the route originator node transmits a unicast route confirmation message to the relay node. The route confirmation message includes information that identifies the route destination node as the final destination for the second unicast message.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The example methods described and/or illustrated herein may also omit one or more of the steps described or illustrated herein or include additional steps in addition to those disclosed.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the present invention.

Embodiments according to the invention are thus described. While the present invention has been described in particular embodiments, it should be appreciated that the invention should not be construed as limited by such embodiments, but rather construed according to the following claims.

What is claimed is:

1. At a relay node in a wireless mesh network, a method of establishing a bidirectional route between a route originator node and a route destination node, the method comprising:
   receiving, over a first link with a second node in the wireless mesh network, a first route request message comprising information that identifies the route destination node as a final destination for the first route request message and also comprising information that identifies a transmitted power level used by the second node to transmit the first route request message;
   determining whether the first link is bidirectional, wherein said determining comprises determining an amount of power loss between the second node and the relay node by comparing the transmitted power level used by the second node and a measure of received signal strength for the first route request message, and comparing the amount of power loss and a transmission power level for the relay node, wherein the first link is bidirectional if the transmission power level for the relay node is greater than the amount of power loss; and
   transmitting a second route request message comprising a forwarding version of the first route request message over a second link to a third node in the wireless mesh network when the first link is bidirectional, and otherwise not transmitting the second route request message.

2. The method of claim 1, wherein said determining further comprises:
   in response to said receiving the first route request message from the second node, transmitting a test message to the second node; and
   determining whether a response to the test message is received, wherein the first link is bidirectional if the response to the test message is received.

3. The method of claim 1, further comprising including a transmitted power level in the second route request message that is transmitted to the third node.

4. The method of claim 1, further comprising incrementing a value of a hop count in the first route request message, wherein the second route request message that is transmitted to the third node comprises the incremented value of the hop count.

5. The method of claim 1, wherein the second node is the route originator node and the first route request message is a broadcast route request message generated and transmitted by the route originator node to a plurality of nodes in the wireless mesh network.

6. The method of claim 1, wherein the third node is another relay node that transmits a third route request message comprising a forwarding version of the second route request message to a fourth node in the wireless mesh network over a third link only if the second link with the second node is bidirectional, and wherein the fourth node is selected from the group consisting of: yet another relay node; and the route destination node that is the final destination identified in the first route request message.

7. The method of claim 1, wherein the third node is the route destination node that is the final destination identified in the first route request message.

8. The method of claim 1, further comprising:
subsequent to said transmitting the second route request message, receiving a unicast first route reply message from the third node, wherein the first route reply message comprises information that identifies the route originator node as a final destination for the first route reply message; and
in response to said receiving the first route reply message, transmitting a unicast second route reply message comprising a forwarding version of the first route reply message to the second node.

9. The method of claim 8, further comprising transmitting an acknowledgment message to the third node in response to said receiving the first route reply message.

10. The method of claim 8, further comprising:
subsequent to said transmitting the second route reply message, receiving a unicast route confirmation message from the second node, wherein the route confirmation message comprises information that indicates that a version of the first route reply message was received by the route originator node; and
transmitting the route confirmation message to the third node.

11. At a route destination node in a wireless mesh network, a method of establishing a bidirectional route to a route originator node, the method comprising:
receiving a plurality of route request messages from a plurality of relay nodes over a plurality of links in the wireless mesh network, wherein each route request message of the plurality of route request messages comprises information that identifies the route originator node and also comprises a respective transmitted power level used by a respective relay node to transmit the route request message to the route destination node;
determining a respective amount of power loss for each link of the plurality of links by comparing, for each route request message of the plurality of route request messages, the respective transmitted power level and a measure of received signal strength for the route request message;
selecting a first relay node of the plurality of relay nodes based on the respective amount of power loss;
transmitting a unicast route reply message to the first relay node, wherein the route reply message comprises information that identifies the route originator node as a final destination for the first route reply message;
determining whether an acknowledgment message has been received from the first relay node in response to the route reply message; and
if the acknowledgment message has not been received, then transmitting the route reply message to a second relay node of the plurality of relay nodes.

12. The method of claim 11, wherein said each route request message further comprises a respective value of a hop count, wherein said selecting the first relay node is further based on the respective value of the hop count.

13. The method of claim 11, further comprising, if the acknowledgment message has not been received:
transmitting a test message periodically to the first relay node until a response to the test message is received.

14. The method of claim 11, further comprising, if the acknowledgment message has not been received:
not responding to subsequent route request messages from the first relay node until a condition is satisfied.

15. The method of claim 14, wherein the condition is selected from the group consisting of: the first relay node responds to a test message transmitted by the route destination node; and the respective amount of power loss between the first relay node and the route destination node satisfies a threshold value.

16. The method of claim 11, further comprising receiving a unicast route confirmation message from the first relay node, wherein the route confirmation message comprises information that indicates that a version of the route reply message was received by the route originator node.

17. At a route originator node, a method of establishing a bidirectional route to a route destination node in a wireless mesh network, the method comprising:
transmitting, to a plurality of relay nodes in the wireless mesh network, a broadcast route request message comprising information that identifies the route destination node as a final destination for the route request message;
determining that a link between the route originator node and a relay node of the plurality of relay nodes is a bidirectional link, wherein the link is a bidirectional link when the relay node's transmission power is greater than an amount of power loss on the link, and wherein said determining comprises receiving a test message from the relay node over the link in response to the broadcast route request message and then sending a response to the test message to the relay node over the link;
receiving, from the relay node over the link, a unicast route reply message comprising a forwarded version of a unicast route reply message that was transmitted by the route destination node in response to receiving a forwarded version of the route request message; and
in response to the route reply message received from the relay node, transmitting, to the relay node over the link, a unicast route confirmation message comprising information that identifies the route destination node as a final destination for the route confirmation message.

18. The method of claim 17, wherein the route request message also identifies a transmitted power level used by the route originator node to transmit the route request message, wherein said determining further comprises determining an amount of power loss between the route originator node and the relay node by comparing the transmitted power level used by the route originator node and a measure of received signal strength for the route request message, and comparing the amount of power loss and a transmission power level for the relay node, wherein the link is bidirectional if the transmission power level for the relay node is greater than the amount of power loss.

19. The method of claim 17, wherein the route confirmation message informs the relay node to update a routing table of the relay node to indicate that the relay node is part of the bidirectional route between the route originator node and the route destination node.

* * * * *